(12) United States Patent
Cash et al.

(10) Patent No.: US 8,388,739 B2
(45) Date of Patent: Mar. 5, 2013

(54) METHOD FOR TREATING CONTAMINATED GAS

(75) Inventors: Edwin W. Cash, Dewitt County, TX (US); Thomas J. Bradley, Victoria County, TX (US)

(73) Assignee: Valerus Compression Services, LP, Houston, TX (US)

( * ) Notice: Subject to any disclaimer, the term of this patent is extended or adjusted under 35 U.S.C. 154(b) by 0 days.

(21) Appl. No.: 13/369,716

(22) Filed: Feb. 9, 2012

(65) Prior Publication Data

US 2012/0145002 A1 Jun. 14, 2012

Related U.S. Application Data

(60) Division of application No. 12/778,601, filed on May 12, 2010, now Pat. No. 8,137,445, which is a continuation of application No. 11/329,015, filed on Jan. 10, 2006, now Pat. No. 7,740,691.

(51) Int. Cl.
*B01D 47/02* (2006.01)
*B01D 53/18* (2006.01)

(52) U.S. Cl. .................. 95/226; 95/228; 95/235; 95/236
(58) Field of Classification Search .................... 95/226, 95/228, 235, 236
See application file for complete search history.

(56) References Cited

U.S. PATENT DOCUMENTS

| | | | |
|---|---|---|---|
| 3,758,603 A | 9/1973 | Steigelmann | |
| 3,897,227 A | 7/1975 | Giammarco et al. | |
| 4,079,117 A | 3/1978 | Butwell | |
| 4,093,701 A | 6/1978 | Butwell | |
| 4,184,855 A | 1/1980 | Butwell et al. | |
| 4,350,505 A | 9/1982 | Mallory et al. | |
| 4,372,925 A | 2/1983 | Cornelisse | |
| 4,421,725 A | 12/1983 | Dezael et al. | |
| 4,483,834 A | 11/1984 | Wood | |
| 4,548,620 A | 10/1985 | Albiol | |
| 4,824,443 A | 4/1989 | Matson et al. | |
| 4,853,012 A * | 8/1989 | Batteux et al. ................. 95/174 |
| 5,201,919 A | 4/1993 | Jahn | |
| 5,453,107 A * | 9/1995 | Liu ................................. 96/344 |
| 5,603,908 A | 2/1997 | Yoshida et al. | |
| 5,820,837 A | 10/1998 | Marjanovich et al. | |
| 5,853,680 A | 12/1998 | Iijima et al. | |

(Continued)

FOREIGN PATENT DOCUMENTS

| | | |
|---|---|---|
| EP | 0954369 B1 | 11/2003 |
| WO | WO 2004/058384 A1 | 7/2004 |
| WO | WO 2004/080573 A1 | 9/2004 |

OTHER PUBLICATIONS

Bhatia et al., "Examination of field data from a new gas sweetening process", Conference: Society of Petroleum Engineers annual technical conference and exhibition, Oct. 5, 1986, Abstract retrieved from Energy Citations Database, http://www.osti.gov/energycitations/product.biblio.jsp?osti_id=7198755.

(Continued)

*Primary Examiner* — Walter D Griffin
*Assistant Examiner* — Renee E Robinson
(74) *Attorney, Agent, or Firm* — King & Spalding

(57) ABSTRACT

A method for treating natural gas using a vessel having a manifold for introducing gas in the vessel, a flow disperser above the manifold that prevents channeling of the gas, a spray system for spraying a treating liquid into an upwardly rising column of gas and, optionally, a liquid level controller for maintaining the level of a pool of treating liquid above the flow disperser.

15 Claims, 2 Drawing Sheets

U.S. PATENT DOCUMENTS

| | | | |
|---|---|---|---|
| 6,063,163 | A | 5/2000 | Carmody |
| 6,399,030 | B1 | 6/2002 | Nolan |
| 6,740,230 | B1 | 5/2004 | Hugo |
| 6,893,484 | B2 * | 5/2005 | Thomas .......................... 95/226 |
| 6,918,949 | B1 | 7/2005 | Peters |
| 2007/0251393 | A1 * | 11/2007 | Pope et al. ....................... 96/329 |

OTHER PUBLICATIONS

Fair et al., Gas Adsorption, Section 14—Perry's Chemical Engineers' Handbook, 7th Ed., 1997, pp. 14-13.

Kishan et al., "Examination of Field Data from a New Gas Sweetening Process," $61^{st}$ Annual Technical Conference and Exhibition of the Society of Petroleum Engineers held in New Orleans, LA, Oct. 5-8, 1986, SPE 15456 (10 pages).

Lyddon et al., "Analysis of Various Flow Schemes for Sweetening with Amines", Proceedings of the 78th GPA Annual Convention, Nashville, TN, 1999. Available at http://www.bra.com/Resources/Technical/Articles/tebid/96/Defaultaspx (last visited Oct. 7, 2007).

* cited by examiner

METHOD FOR TREATING CONTAMINATED GAS

RELATED APPLICATION

This application is a divisional of U.S. patent application Ser. No. 12/778,601 filed May 12, 2010 now U.S. Pat. No. 8,137,445 and entitled "Gas Treatment Method and Apparatus," which is a continuation of U.S. patent application Ser. No. 11/329,015 filed Jan. 10, 2006, now U.S. Pat. No. 7,740,691 and entitled "Gas Treatment Method and Apparatus." The complete disclosure of each the above-identified applications is hereby fully incorporated herein by reference.

TECHNICAL FIELD

This invention relates to a method and apparatus for treating gas, particularly natural gas, to remove contaminants so the gas will meet sales requirements.

BACKGROUND OF THE INVENTION

Natural gas, as it comes from the ground, is not salable because it contains components that make it unsuitable for long distance transportation. For example, produced natural gas is almost always saturated with water vapor that must be removed in order to prevent water from condensing in a long distance pipeline, to prevent the formation of gas hydrates and to avoid expending substantial amounts of energy to transport water. Similarly, it makes perfect sense for an operator to remove any liquefiable hydrocarbons because they usually bring better prices when sold separately as liquids than as gas phase components sold to a gas pipeline.

Contaminants, such as hydrogen sulfide and carbon dioxide, also must be removed because pipeline companies do not want to accept natural gas with greater than a very small percentage of these components. It makes perfect sense to remove hydrogen sulfide because, when burned, it creates sulphur dioxide which easily hydrolyses to produce sulfuric acid which is very corrosive thereby creating problems for the customers of pipelines. In addition, an inappropriate amount of hydrogen sulfide causes steel, such as in pipelines, valves and compressors, to weaken thereby creating a safety hazard. Carbon dioxide is desirably removed because it hydrolyses easily to create carbonic acid, a weak acid that is nevertheless corrosive over ordinary periods of time. In addition, carbon dioxide reduces the heating value of natural gas beyond its simple dilution of natural gas. It will accordingly be apparent that gas pipelines have long required the removal of a variety of contaminants from natural gas offered to them.

It is accordingly not surprising that the industry has developed a rather wide variety of gas treating equipment to remove water, liquefiable hydrocarbons, carbon dioxide, hydrogen sulfide, and other contaminants from natural gas. The standard technique for removing hydrogen sulfide and carbon dioxide is to contact natural gas with an amine to remove the carbon dioxide and/or hydrogen sulfide and regenerate the amine by heating it so the carbon dioxide and/or hydrogen sulfide comes out of solution. It is this technique to which this invention most nearly relates.

Relevant to this invention are the disclosures in U.S. Pat. Nos. 3,758,603; 4,853,012; 5,201,919; 6,063,163; 6,399,030; 6,740,230 and 6,896,484.

SUMMARY OF THE INVENTION

One feature of a gas treating facility of this invention comprises a contactor of unusual configuration for mixing a treating liquid and natural gas. Although the current application for this invention is in the removal of carbon dioxide and/or hydrogen sulfide from natural gas using an amine treating liquid, it will be apparent that other contaminants may be removed or other treating liquids may be used. Because of its ability to absorb large quantities of carbon dioxide and hydrogen sulfide, its stability at design temperatures of this invention and its cost, a preferred treating liquid is diglycolamine, known in the industry by its acronym DGA, available commercially from chemical manufacturers such as Huntsman Chemical or its distributor Thomas Petroleum of Corpus Christi, Tex. For purposes of simplicity and convenience, the treating liquid in this invention is usually stated to be an amine.

Because of the absorption of carbon dioxide or hydrogen sulfide into the amine, a certain amount of heat is generated and the temperature of the gas and liquid both increase. Rather than separating the gas and delivering it to sales as in the prior art, both liquid and gas from the contactor are delivered to a substantial heat exchanger downstream of the contactor thereby accomplishing three things. First, the temperature of the gas is reduced sufficiently so the downstream meters, dehydrators and doped pipeline are unaffected. Second, there is additional mixing of the amine and gas in the powered heat exchanger thereby promoting increased absorption of contaminants from the gas stream into the amine. Third, the lowered temperature decreases the occurrence and severity of erosion and corrosion problems. A combined stream of gas and amine leave the powered cooler and flow to a two phase separator where the liquid amine is separated from the gas. The gas is delivered to sales or to a dehydrator and then to sales.

The contaminant rich liquid amine passes to a regeneration process or system where the contaminant is driven off from the amine which is returned to the contactor in a closed loop. The regeneration system is similar to a prior art condensate stabilization system and comprises an inlet low pressure three phase separator where gaseous components are flashed off thereby separating gaseous hydrocarbons, liquid hydrocarbons and contaminant rich amine. The liquid hydrocarbons are accumulated in a tank for sale. The gaseous hydrocarbons are either used for fuel or flared thereby reducing emissions from the facility.

Cool contaminant rich amine leaves the three phase separator and is heated, both by indirect heat exchange with hot contaminant lean amine, and in a heater to produce hot amine. The hot amine passes into a flash separator where steam and the gaseous contaminant flash off of the amine thereby regenerating the amine and producing a contaminant lean amine. The steam and contaminant pass into an ambient cooler where water and any liquefiable hydrocarbons are condensed and the uncondensible contaminant is delivered to a disposal unit. Water and liquid hydrocarbons are separated with the hydrocarbons being sent to a tank for sale. The water from the condensed steam, perhaps carrying some amine, is mixed with the cool contaminant rich amine upstream of the indirect heat exchanger. The hot contaminant lean amine is passed in indirect heat exchange to heat the cool contaminant rich amine and then is pumped into the contactor thereby restarting the cycle.

There are many advantages to the gas treating method and apparatus of this invention. The facility is quite compact and can be placed on two skid mounted units, meaning that it can be relocated for a minor fraction of the cost of relocating a conventional amine plant of comparable capacity. Because there are no tall towers in the facility of this invention, construction costs are much lower because no crane is needed.

Because the amount of amine being circulated is much lower, there is a much reduced quantity of amine in the facility, meaning that the initial charge of amine is much less expensive. Computer simulations suggest that fuel cost is about half that of a conventional amine plant. As expensive as natural gas has become, estimated fuel savings are comparable to the cost of leasing the facility. Because there are no tall towers and other expensive components, initial capital costs are much lower.

It is an object of this invention to provide an improved method and apparatus for treating natural gas.

Another object of this invention is to provide a method and apparatus for removing contaminants from natural gas in an efficient expeditious manner.

A further object of this invention is to provide an improved gas treating facility which is inexpensive to manufacture, which has lower operating costs, which can be relocated much easier than prior art facilities.

These and other objects of this invention will become more fully apparent as this description proceeds, reference being made to the accompanying drawings and appended claims.

DETAILED DESCRIPTION OF EXEMPLARY EMBODIMENTS

Figure 1:
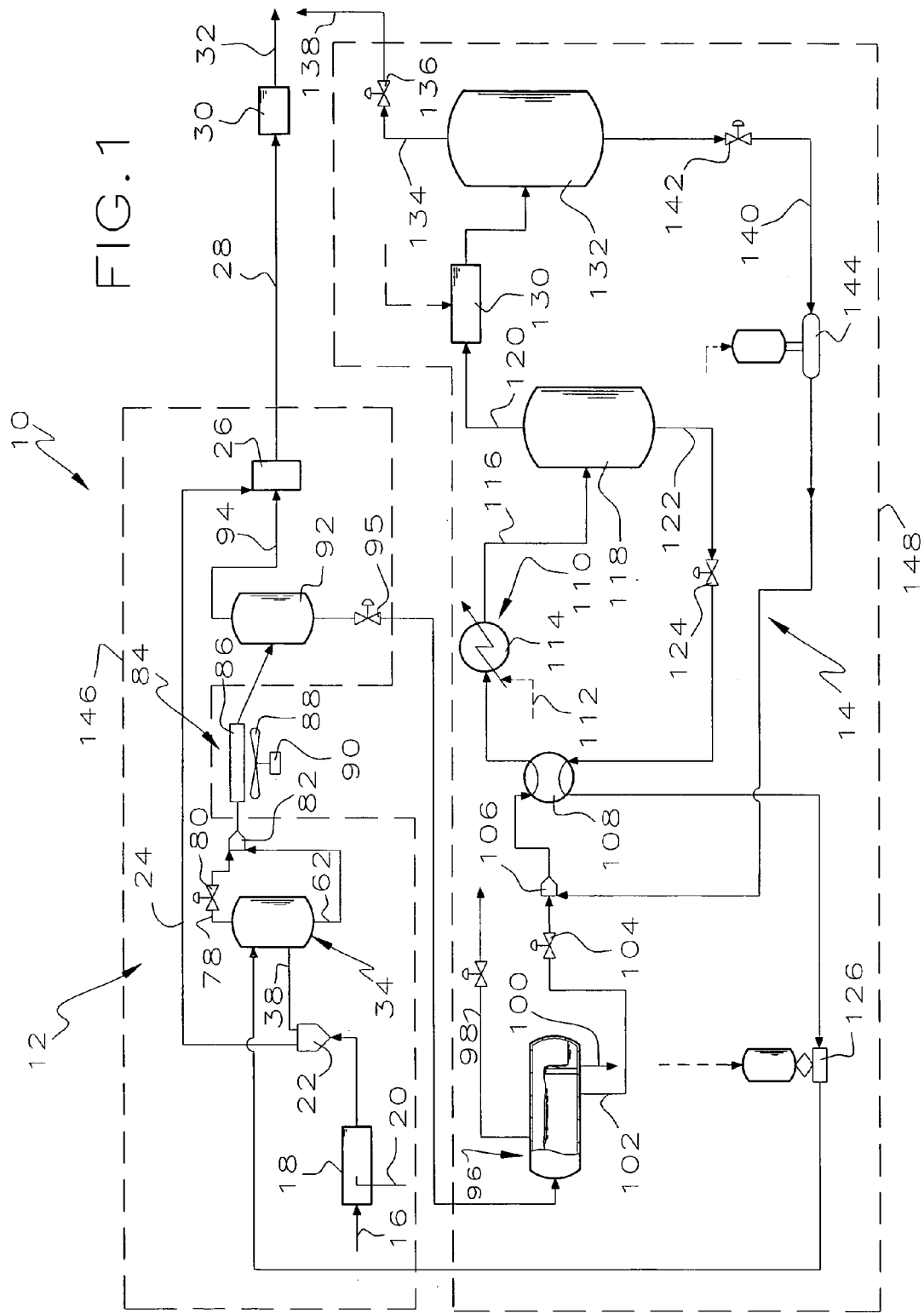
FIG. 1 is a flow diagram of a gas treating apparatus of this invention.
Figure 2:
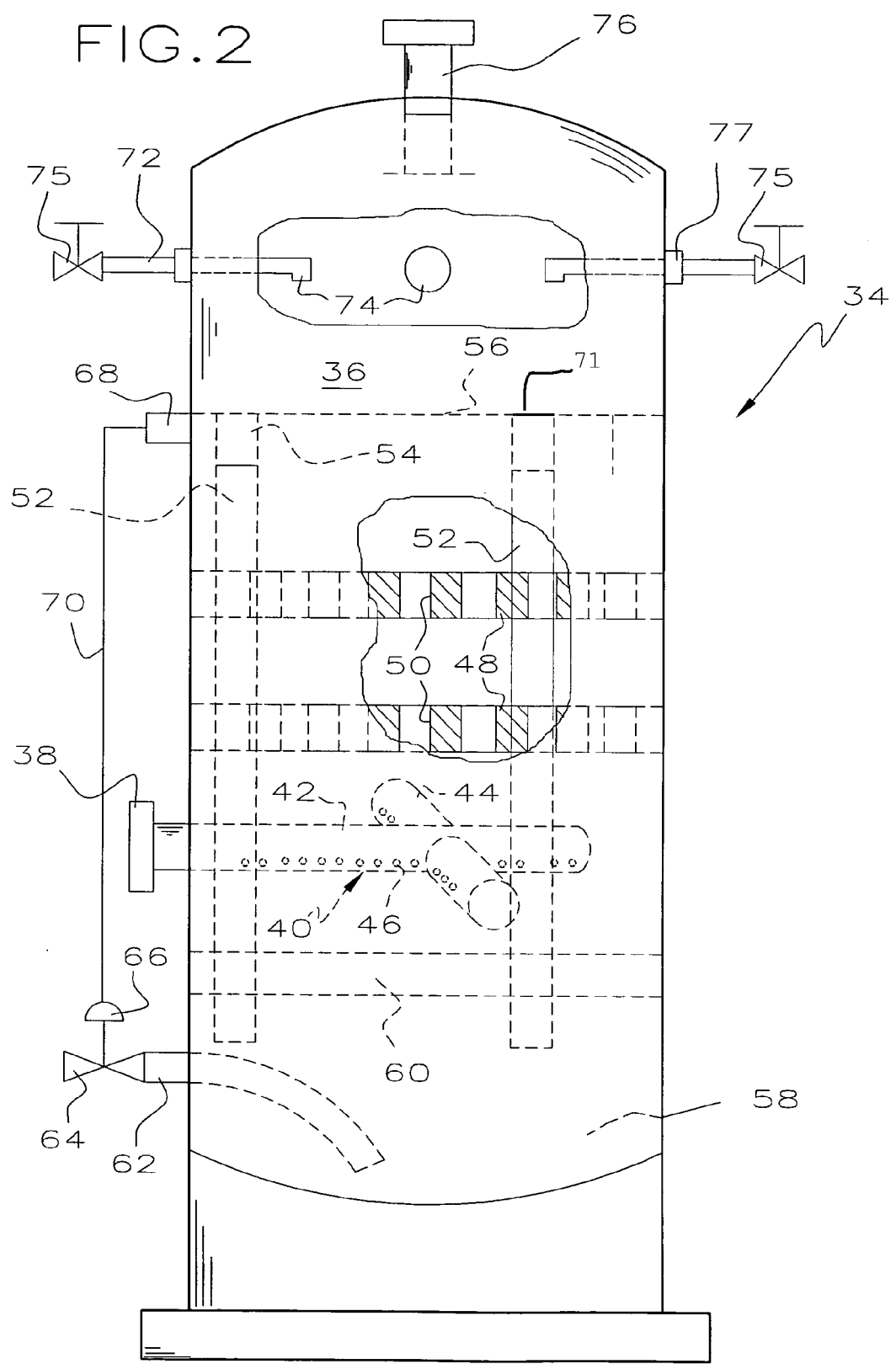
FIG. 2 is an enlarged partially broken side view of a contactor of this invention.

Referring to FIGS. 1-2, a gas treating facility 10 of this invention is illustrated as being an amine plant for the removal of carbon dioxide and/or hydrogen sulfide although many of the principles involved and components may be used in the removal of other contaminants such as in the dehydration of natural gas. Thus, in some narrower aspects, the gas treating facility 10 may be called an amine plant.

The amine plant 10 of this invention comprises, as major components, a gas treating system 12 and an amine regenerating system 14. Raw gas enters the gas treating system 12 through an inlet conduit 16 and may pass through a humidifier 18 where sufficient water may be injected into the gas stream from a source 20 in the event the gas is unsaturated, which is somewhat unusual. The gas may pass through a splitter or proportioning valve 22 where a fraction of the raw gas may bypass gas treatment through a conduit 24. Treated and untreated gas commingle in a mixer 26 and pass through a conduit 28 and then to sales through a dehydrator 30, meter and sales line 32. This technique is particularly desirable when the amine plant 10 produces an output gas having contaminant levels significantly below that required by the purchasing pipeline. By commingling untreated gas and treated gas significantly below contract requirements, a significantly larger volume of natural gas may be handled.

For reasons which are mainly historical, the oil and gas industry has created a mindset, or idee fixe, that contactors used in amine plants have to be tall towers, e.g. 25' and higher, equipped with bubble trays in order to provide sufficient contact between natural gas to be treated and amine treating liquids. This results in amine plants that are large and cannot be readily broken down and transported to another location.

The gas treating system 12 includes a contactor 34 of a preferred design shown in more detail in FIG. 2. Although the contactor 34 is much preferred for reasons that will become more fully apparent hereinafter, other contactor designs will also work in the overall context of this invention. The contactor 34 comprises a vessel 36 which is preferably a cylindrical high pressure vessel having a rated operating pressure above 800 psig. As contrasted to a prior art contactor tower of 50' tall in a 10,000 MCFD plant, the vessel 36 in a comparable capacity plant of this invention is typically 24" ID×10' tall.

The vessel 36 provides a gas inlet 38 connected to a manifold 40 for spreading incoming gas throughout the diameter of the vessel 36. The manifold 40 accordingly includes a main branch 42 and one or more lateral branches 44, all having openings 46 for distributing the incoming gas inside the vessel 36. Above the manifold 40 are at least two flow dispersers such as perforated plates 48 having openings 50 that prevent channeling of the gas upwardly in the vessel 36. Although the perforated plates are preferred, it will be apparent to those skilled in the art that a wide variety of flow dispersers are operative to minimize upward gas channeling, such as ceramic ball packing, steel poll rings, vane mist dispersers, stainless steel wool and the like. It will be apparent that many suitable alternatives to the perforated plates are available.

The contactor 34 maintains a liquid level of amine above the uppermost plate 48 in any suitable manner, as by the provision of an overflow outlet (not shown) or, as shown in FIG. 2, by the use of one or more downcomers 52 having an upper end 54 at the desired liquid level 56. Thus, when amine rises above the level 56, it flows through the downcomers 52 into a sump 58 below a partition wall 60 in the vessel 36. A drain outlet 62 provides a valve 64 having an operator 66 controlled by a liquid level sensor 68 through a wire 70. Because the contactor 34 operates at a significant pressure, e.g. 800 psig, it is necessary to provide the liquid level sensor 68 to maintain a liquid seal in the bottom of the vessel 36 and thereby control the exit of amine from the contactor 34. Otherwise, there is a tendency for gas to pass through the downcomers 52 and blow amine out of the sump 58. Although this might not appear to be a problem because the gas and amine are shortly commingled, it interferes with the spray pattern and efficiency in the top of the vessel 36 as will be more fully apparent hereinafter. A cap (not shown) may be provided on top of the downcomers 52 to prevent spray from above going directly into the downcomers 52. This increases contact efficiency.

It will accordingly be seen that there is considerable contact between the gas to be treated and the treating liquid by the time the gas breaks through the liquid level 56. All amine entering the contactor 34 enters through a plurality conduits 72 having downwardly directed nozzles 74 spraying amine into the rising gas stream breaking through the liquid level 56. The nozzles 74 are of a particular type having the characteristic of producing very small droplets and thus producing a high surface area contact zone between the treating liquid and the rising natural gas at a design pressure and volume. If the plant 10 is designed to circulate 30 gallons/minute of amine, and a nozzle is available that will deliver 7.5 gallons/minute of finely divided spray, it will be apparent that four nozzles 74 are needed. The nozzles 74 are commercially available from Texas Industries, Alice, Tex. An important feature of the nozzles 74 is they can individually be turned off with a valve 75 thereby reducing the quantity of amine circulating through the contactor 34. In addition, the nozzles 74 are slidably mounted in a fixture 77 on the contactor vessel 36 and thus can be completely withdrawn from the contactor 34. This is of particular advantage when pressure gauges (not shown) adjacent the nozzles 74 suggest that too little pressure is being applied to the nozzles 74 commensurate with the volume being delivered. This normally means one or more of the nozzles 74 has been eroded. By making the nozzles 74 so they may be withdrawn from the contactor 34, the nozzles 74 may be inspected and replaced without shutting the plant 10 down. Another advantage of spraying amine onto the liquid surface 56 is to beat down any foam accumulating on the surface 56. Amine is notoriously prone to foam and spray from the nozzles 76 tends to minimize it.

The rule of thumb of conventional amine contactors using bubble trays is that seven to nine iterations are required for adequate contact, an iteration being what happens when gas flows through one bubble tray. The contactor 34 provides contact between the amine and gas equal to about four iterations, is much simpler in construction and has fewer maintenance problems because the contactor 34 is different than all known oil field amine units in that it has no bubble trays or bubblers.

An unusual feature of the contactor 34 is there is no demister or other equipment to prevent droplets of amine from passing through the gas exit. The reason, of course, is that the gas and amine are commingled downstream and such equipment would be an expense to no effect. Another unusual feature of the contactor 34 is that it is sufficiently short that, if vertically mounted on a skid, it can be transported by truck on normal highways and not contact or interfere with normal overhead crossings in contrast to all commercially available amine contactors used in oil and gas operations.

Gas passing out of the top of the contactor 34 enters a conduit 78 having a back pressure valve 80 creating a suitable pressure drop, e.g. 30-40 psig, so amine passing through the drain 62 is the same pressure as gas exiting through the top of the contactor 34. In other words, there is a greater pressure drop in the drain 62 and valve 64 than in the gas conduits 78 and a pressure drop in the gas conduit is needed so the gas and liquid will easily remix. The gas and liquid commingle in a mixer 82 and pass into a powered cooler 84 comprising a heat exchanger 86 and a fan 88 powered by a motor 90, which is preferably an electric motor but which may be an internal combustion engine, forcing air across the heat exchanger 86 and thereby cooling the gas and amine to a temperature reasonably close to ambient. In one particular installation, the design temperature exiting the cooler 84 is 15° F. above ambient.

Additional mixing of the amine and gas occurs in the mixer 82 and in the heat exchanger 86, providing several additional iterations so, by the time the gas and amine exit from the heat exchanger, there is sufficient contact time and surface area to load the amine with carbon dioxide and/or hydrogen sulfide and thereby produce a gas stream having carbon dioxide and/or hydrogen sulfide at considerably lower levels than is dictated by industry custom or requirement. In addition, the carbon dioxide and/or hydrogen sulfide concentration in the amine is greater than is normal by industry standards. An important fact is that the solubility of carbon dioxide and/or hydrogen sulfide decreases with temperature. Thus, an important feature of the cooler 84 is that it reduces the temperature of the gas and the amine so that additional carbon dioxide and/or hydrogen sulfide may be absorbed into the amine. Even though the absorption of carbon dioxide into amine is exothermic and the resultant amine is considerably caustic, cooling the stream in the cooler 84 not only allows increased quantities of carbon dioxide to be absorbed, it also reduces corrosion and erosion of downstream metal components because, among other things, the pH of the stream does not exceed customary limits that are tolerated by conventional vessels and piping.

For reasons which are mainly historical, the oil and gas industry has created a mindset, or idee fixe, that the only way to break carbon dioxide and/or hydrogen sulfide out of amine treating liquids is to deliver hot amine and steam into tall towers. This results in amine plants that are large and cannot be readily broken down and transported to another location.

Gas and amine exiting from the heat exchanger 86 pass into a conventional two phase separator 92 operating at relatively high pressure, e.g. 800 psig, where gas exits through a line 94 connected to the mixer 26 where treated and untreated gas are mixed in a proportion to meet sales requirements. For example, if gas exiting from the heat exchanger 86 has a carbon dioxide content of 1.6% and maximum allowable carbon dioxide is 2.0%, then the proportioning valve 22 can be adjusted to allow a considerable amount of gas, depending on the carbon dioxide content before treatment, to bypass the gas treating system 12 and thereby avoid the costs, both capital and operating, of unnecessarily treating the gas. Although the separator 92 is illustrated as being a relatively large diameter vessel which relies on the inability of a rising gas stream to move liquid droplets upwardly so that the liquid collects in the bottom of the vessel, any suitable type separator may be employed, as is the case of other separators in the gas treating facility of this invention.

Relatively cool contaminant rich amine exits the separator 92 through a pressure reducing valve 95 and passes into one or more conventional separators for separating contaminant rich amine, uncondensed hydrocarbon gases and liquid hydrocarbons, if the treated natural gas has a proportion of liquefiable hydrocarbons. This may be accomplished by a conventional low pressure three phase separator or a gas-liquid separator in series with a liquid-liquid separator. Both installations are hereinafter called a three phase separator. A low pressure three phase separator 96 includes a gas outlet conduit 98, a first liquid outlet conduit 100 for liquid hydrocarbons and a second liquid outlet conduit 102 for amine. Because of the back pressure valve 95, the separator 96 operates at a much lower pressure, e.g. 50 psig, than the separator 92, e.g. 800 psig, and thus acts as a flash tank or separator to flash off any gases dissolved in the amine that are susceptible to coming out of solution at roughly ambient temperature and much reduced pressure. These gases are largely short chained hydrocarbon gases that are delivered to a burner, such as a flare unit or to a fuel consuming device described hereinafter or to another fuel consuming device used in the vicinity of the gas treating facility 10. In any event, by flashing off gaseous hydrocarbons and then burning them, there is a considerable reduction in the atmospheric release of volatile organic compounds when compared to conventional amine units where these gases come out of solution with the contaminants and are vented to the atmosphere and typically are not burned because this mixture is normally not flammable or, if flammable, produces such quantities of sulfuric or sulfurous acid as to be undesirable.

In the event the treated natural gas contains a significant quantity of liquefiable hydrocarbons, the liquid outlet conduit 100, carrying liquid hydrocarbons, connects to a suitable tank for temporarily storing the liquids until they, can be accumulated in a sufficient amount and sold. There are some locales, of course, such as Zapata County, Texas where produced natural gas contains almost no liquefiable hydrocarbons, meaning that a three phase separator is unnecessary and a two phase separator is completely satisfactory.

The liquid outlet conduit 102, carrying relatively cool contaminant rich amine, connects to a control valve 104 and mixer 106 before entering an indirect heat exchanger 108 where the cool amine is in indirect heat exchange with hot lean amine thereby heating the cool contaminant rich amine considerably. Although the amount of heating will be dependent on the design of a particular installation, a typical heat exchanger 108 will raise the amine temperature from a few degrees above ambient to a value in the neighborhood of 180° F.

It seems counterintuitive to cool the amine in the cooler 84, and then almost immediately reheat it in the heat exchanger 108 but there are several good reasons. By operating the low pressure separator 96 at roughly ambient temperature, the only gases that are flashed off are short chain hydrocarbons and not carbon dioxide and/or hydrogen sulfide that would also be flashed off at much higher temperatures. Thus, cooling the amine in the cooler 84 allows the separation of hydrocarbon gases and hydrocarbon liquids in the separator 96. This allows the hydrocarbon liquids to be sold and the hydrocarbon gases to either be flared or burned for fuel, providing an economic advantage in the later case and an environmental advantage in both cases.

Downstream of the indirect heat exchanger 108 is an indirect heater 110 having a fuel source 112 which may partially be the hydrocarbon gas from the line 98. Preferably the heater 110 includes a vessel 114 filled with a suitable liquid heated by burning fuel from the source 112 and a series of heat exchange passages (not shown) for the amine. The liquid in the vessel 114 may be of any suitable type and is typically a heat transfer oil such as Citgo Hytherm 46, triethylene glycol or the like. The temperature of the treating liquid exiting the heater 110 is sufficient to flash off the contaminants and any water and, in a typical facility to remove carbon dioxide and/or hydrogen sulfide, is on the order of about 270° F.

Hot contaminant rich amine leaves the heater 110 and passes through a line 116 to a flash separator 118 operating a few psi above atmospheric pressure. Steam and contaminant gases flash off the amine and exit through a gas outlet 120. Hot lean amine passes out of a liquid outlet 122, through a control valve 124 and into the indirect heat exchanger 108 thereby heating the cool contaminant rich amine on its way to the heater 110. The cool lean amine passes through a main circulation pump 126 and then into the contactor 34 where the amine cycle starts again.

Steam and gaseous contaminants pass through the gas outlet 120 into a ambient reflux condenser 130. The condenser 130 may be a conventional natural convection heat exchanger giving off heat to the atmosphere and acts to reduce the temperature of the gas to a point where steam condenses into water. The condenser 130 delivers a mixture of hot water, some amine and uncondensed contaminant gases to a separator 132 where carbon dioxide and/or hydrogen sulfide pass off though a gas outlet 134 and a control valve 136 to a disposal unit, which is typically a vent stack 138 extending well into the air.

Condensed hot water and some amine passes out of the separator 132 through a liquid outlet line 140 and control valve 142 to a circulating pump 144 delivering liquid into the mixer 106. It will accordingly be seen that the line 140 and pump 144 constitute a reflux loop for circulating water which is converted into steam in the heater 110 thereby assisting carbon dioxide and/or hydrogen sulfide to come out of solution from the amine.

A prototype facility of this invention was designed to handle 10,000 MCFD of incoming natural gas at 110° F. and 900 psig having 5% carbon dioxide and very little hydrogen sulfide. The design amount of amine circulating through the contactor 34 is 30 gallons/minute.

The following design parameters are noted:
  temperature of amine and gas leaving contactor 34—170° F.
  temperature of amine and gas leaving cooler 84—ambient +15° F.
  operating pressure of separator 92—800 psig
  operating pressure of separator 96—50 psig
  temp of amine entering heat exchanger 108—ambient +15° F.
  temperature of amine leaving heat exchanger 108—180° F.
  temperature of amine leaving heater 110—270° F.
  operating pressure of separator 118—12 psig
  temperature of water leaving condenser 130—ambient +10° F.
  temperature of amine entering contactor 34—ambient +5° F.

An important feature of this invention is the relatively small amount of amine circulating, when compared to a conventional amine unit of the same treating capacity. It will be realized that capital costs and operating expenses are directly related to the circulation rate of amine. A conventional amine facility to treat 10,000 MCFD of the same quality natural gas circulates 100 gallons/minute, meaning that, with this invention, capital costs are much lower, operating costs are much lower and the total amount of amine in the facility is much lower meaning that the cost of initially charging the system with amine is much lower. This invention also is much more compact than comparable prior art amine units and consequently is much easier and less expensive to relocate when the wells connected to it deplete their reservoir. All of the vessels in the regeneration system 14 are short enough, to be transported by truck in a normal vertical operating position, over long distances over normal roads without interfering with normal overpasses. Another disadvantage of prior art amine units is that they must circulate the design amount of amine even if the amount of gas flowing through them declines substantially, meaning that the treating cost per MCF rises as the volume declines. In this invention, all of the pumps are variable speed and the circulation rate of the amine may be reduced when the volume of gas declines, as by shutting off the nozzles 74 and/or removing the nozzles 74 from the contactor 34.

As shown in FIG. 1, the gas treating facility 10 is preferably skid mounted, i.e. most of the gas treating system 12, except for the cooler 84, fits on a first skid 146 while most of the liquid regeneration system 14 fits on a second skid 148. The cooler 84 and the vent stack 138 are separate pieces, but they are easily mounted on a single truck. The amine plant 10 of this invention is also characterized by high capacity, i.e. in excess of 5,000 MCFD at carbon dioxide concentrations of greater than 3% and the absence of tall towers, 25' or greater, which require a crane to install and which cannot be transported over normal roads by truck in a vertical position. Another advantage of this invention is that the gas treating facility may be made in modules, e.g. of 5,000 MCFD capacity, so that when wells delivering to a particular installation dwindle off in volume, the modules may be sequentially removed and transported to another site where additional capacity is needed.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

What is claimed is:

1. A method for treating contaminated gas comprising:
  introducing a contaminated gas into a high pressure vessel comprising a pool of contaminant-absorbing liquid, wherein the contaminated gas is introduced through a manifold at a level below the top level of the pool of contaminant-absorbing liquid;

dispersing the contaminated gas through a flow disperser wherein the flow disperser is positioned in the vessel between the manifold and the top level of the pool of contaminant-absorbing liquid and is operable to prevent channeling of the contaminated gas; and spraying the contaminant-absorbing liquid from a position above the level of the pool of contaminant-absorbing liquid, wherein the contaminant-absorbing liquid moves in a direction opposite to the direction of flow of the contaminated gas.

2. The method of claim 1 wherein the step of dispersing the contaminated gas through a flow disperser comprises dispersing the contaminated gas through a first flow disperser comprising a first perforated plate and dispersing the contaminated gas through a second flow disperser comprising a second perforated plate.

3. The method of claim 1 further comprising the step of introducing the contaminated gas that exits the vessel and contaminant-absorbing liquid into a mixer.

4. The method of claim 1 further comprising the step of introducing the contaminated gas that exits the vessel and contaminant-absorbing liquid into a cooler.

5. The method of claim 4 further comprising the step of reheating the contaminant-absorbing liquid in a heat exchanger after the liquid exits the cooler.

6. The method of claim 1 further comprising the step of establishing a pressure of at least 800 pounds per square inch (psi) over atmospheric pressure within the vessel.

7. The method of claim 1 wherein contaminant-absorbing liquid comprises an amine.

8. A method for treating contaminated gas comprising:

introducing a contaminated gas into a high pressure vessel comprising a pool of contaminant-absorbing liquid, wherein the contaminated gas is introduced through a manifold at a level below the top level of the pool of contaminant-absorbing liquid;

dispersing the contaminated gas through a first perforated plate wherein the perforated plate is positioned in the vessel between the manifold and the top level of the pool of contaminant-absorbing liquid and is operable to prevent channeling of the contaminated gas; and spraying the contaminant-absorbing liquid from a position above the level of the pool of contaminant-absorbing liquid, wherein the contaminant-absorbing liquid moves in a direction opposite to the direction of flow of the contaminated gas.

9. The method of claim 8 further comprising the step of dispersing the contaminated gas through a second perforated plate wherein the perforated plate is positioned in the vessel between the first perforated plate and the top level of the pool of contaminant-absorbing liquid and is operable to prevent channeling of the contaminated gas.

10. The method of claim 8 further comprising the step of introducing the contaminated gas that exits the vessel and contaminant-absorbing liquid into a mixer.

11. The method of claim 8 wherein the step of spraying the contaminant-absorbing liquid from a position above the level of the pool of contaminant-absorbing liquid comprises using a nozzle to form small-sized drops of contaminant-absorbing liquid.

12. The method of claim 8 further comprising the step of maintaining the level of contaminant-absorbing liquid in the high pressure vessel above the first perforated plate while treating the contaminated gas.

13. The method of claim 8 further comprising the step of establishing a pressure of at least 800 pounds per square inch (psi) over atmospheric pressure within the vessel.

14. The method of claim 8 wherein contaminant-absorbing liquid comprises an amine.

15. A method for treating contaminated gas comprising:

establishing a pressure of at least 800 pounds per square inch (psi) over atmospheric pressure within a high pressure vessel establishing a pool of contaminant-absorbing liquid within the vessel;

introducing a contaminated gas into the vessel, wherein the contaminated gas is introduced through a manifold at a level below the top level of the pool of contaminant-absorbing liquid;

dispersing the contaminated gas through a flow disperser wherein the flow disperser is positioned in the vessel between the manifold and the top level of the pool of contaminant-absorbing liquid and is operable to prevent channeling of the contaminated gas; and spraying the contaminant-absorbing liquid from a position above the level of the pool of contaminant-absorbing liquid, wherein the contaminant-absorbing liquid moves in a direction opposite to the direction of flow of the contaminated gas.

\* \* \* \* \*